United States Patent
Chedeau et al.

(10) Patent No.: US 9,648,129 B2
(45) Date of Patent: May 9, 2017

(54) IMAGE FILTERING BASED ON SOCIAL CONTEXT

(71) Applicants: Christopher Serge Benjamin Chedeau, Redwood City, CA (US); Emily B. Grewal, Palo Alto, CA (US); Andrew Chung, San Francisco, CA (US)

(72) Inventors: Christopher Serge Benjamin Chedeau, Redwood City, CA (US); Emily B. Grewal, Palo Alto, CA (US); Andrew Chung, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 377 days.

(21) Appl. No.: 13/801,802

(22) Filed: Mar. 13, 2013

(65) Prior Publication Data

US 2014/0280533 A1 Sep. 18, 2014

(51) Int. Cl.
| | |
|---|---|
| *H04L 29/08* | (2006.01) |
| *G06Q 50/00* | (2012.01) |
| *H04N 21/258* | (2011.01) |
| *H04N 21/2743* | (2011.01) |
| *H04N 21/4782* | (2011.01) |
| *H04N 21/4788* | (2011.01) |

(52) U.S. Cl.
CPC .......... *H04L 67/306* (2013.01); *G06Q 50/01* (2013.01); *H04N 21/25883* (2013.01); *H04N 21/25891* (2013.01); *H04N 21/2743* (2013.01); *H04N 21/4782* (2013.01); *H04N 21/4788* (2013.01)

(58) Field of Classification Search
CPC .......... G06F 15/16; G06F 3/14; G06Q 50/30
USPC .......................................... 709/204
See application file for complete search history.

(56) References Cited

U.S. PATENT DOCUMENTS

| | | | |
|---|---|---|---|
| 8,751,636 B2 | 6/2014 | Tseng | |
| 8,947,547 B1* | 2/2015 | Millikan | .................... 348/211.1 |
| 2011/0099199 A1 | 4/2011 | Stalenhoef | |
| 2011/0099478 A1* | 4/2011 | Gallagher et al. | ............ 715/735 |
| 2012/0233000 A1 | 9/2012 | Fisher | |
| 2012/0233256 A1* | 9/2012 | Shaham | ............ G06F 17/30873 709/204 |
| 2013/0195258 A1* | 8/2013 | Atef et al. | ................. 379/88.01 |
| 2013/0275429 A1* | 10/2013 | York | ................. G06F 17/30029 707/737 |
| 2014/0168272 A1 | 6/2014 | Chedeau | |

FOREIGN PATENT DOCUMENTS

| | | |
|---|---|---|
| KR | 10-2011-0037247 A | 4/2011 |
| WO | WO 2009/070841 A1 | 6/2009 |

OTHER PUBLICATIONS

International Search Report and Written Opinion from International Application No. PCT/US2014/022963, 9 pages, Jun. 30, 2014.

\* cited by examiner

*Primary Examiner* — David Lazaro
*Assistant Examiner* — Zia Khurshid
(74) *Attorney, Agent, or Firm* — Baker Botts L.L.P.

(57) ABSTRACT

In particular embodiments, a computing device determines a social context of each of one or more images to provide for display to a user. The computing device determines a relevance of each of the social contexts to the user. The computing device provides for display to the user one or more of the images based at least in part on the relevance of the social context of each image to the user.

15 Claims, 4 Drawing Sheets

IMAGE FILTERING BASED ON SOCIAL CONTEXT

TECHNICAL FIELD

This disclosure generally relates to images in a social-networking system.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, a social-networking system may determine a social context of one or more images available for display to a user. A social context of an image may be determined based at least in part on metadata associated with the image, information associated with the image in a social graph of the social-networking system, or a combination of both. The social-networking system may determine the relevance of the social context of each of the images to the first user, based at least in part on information associated with the user in the social graph. Based at least in part on the relevance of the social context of each of the images to the user, the social-networking system may provide for display to the user one or more of the images. In particular embodiments, the social-networking system provides one or more display filters associated with one or more of the social contexts, allowing the user to select a display filter to display images associated with a particular social context.

DESCRIPTION OF EXAMPLE EMBODIMENTS

Figure 1:
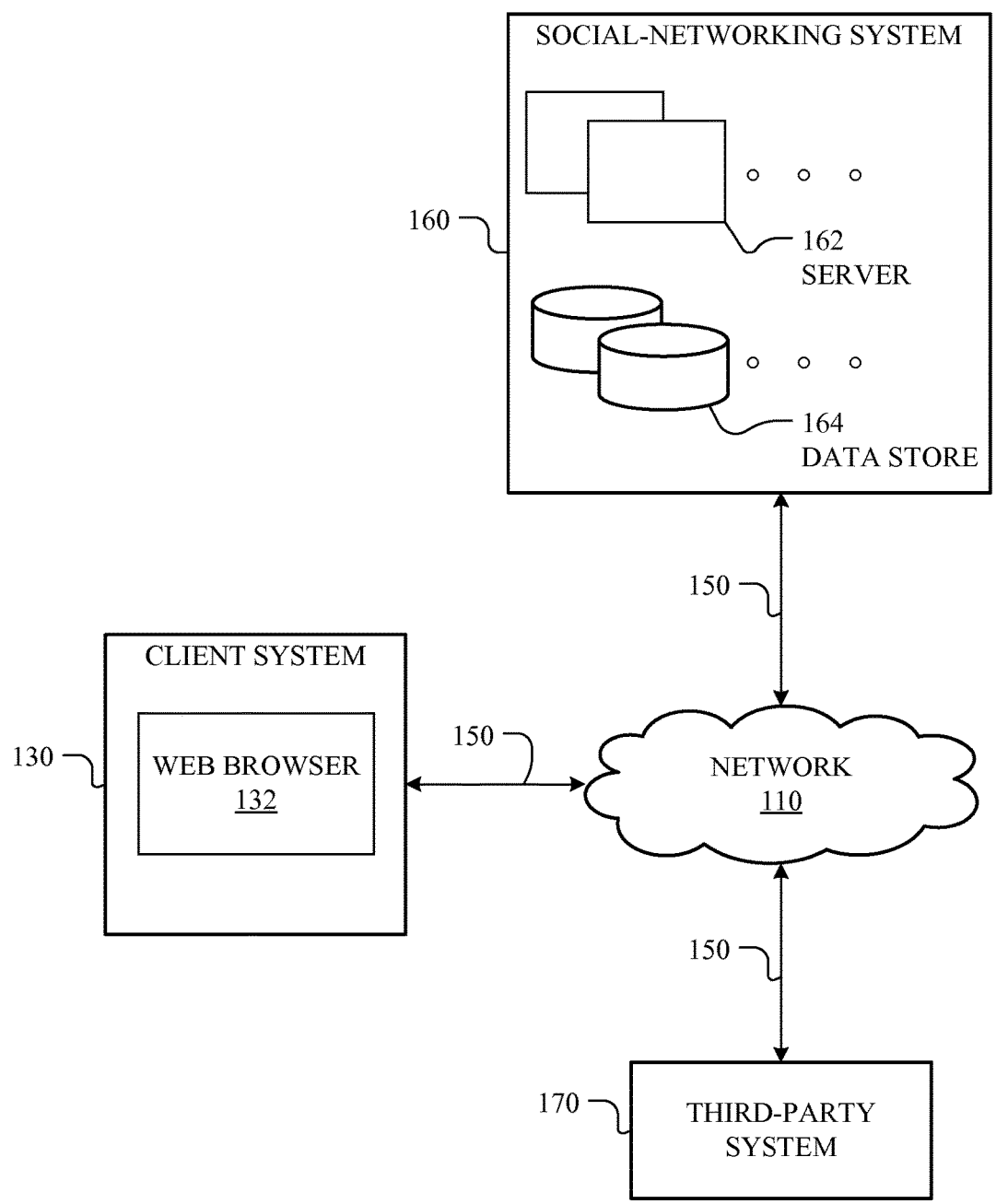
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g. relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g. third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
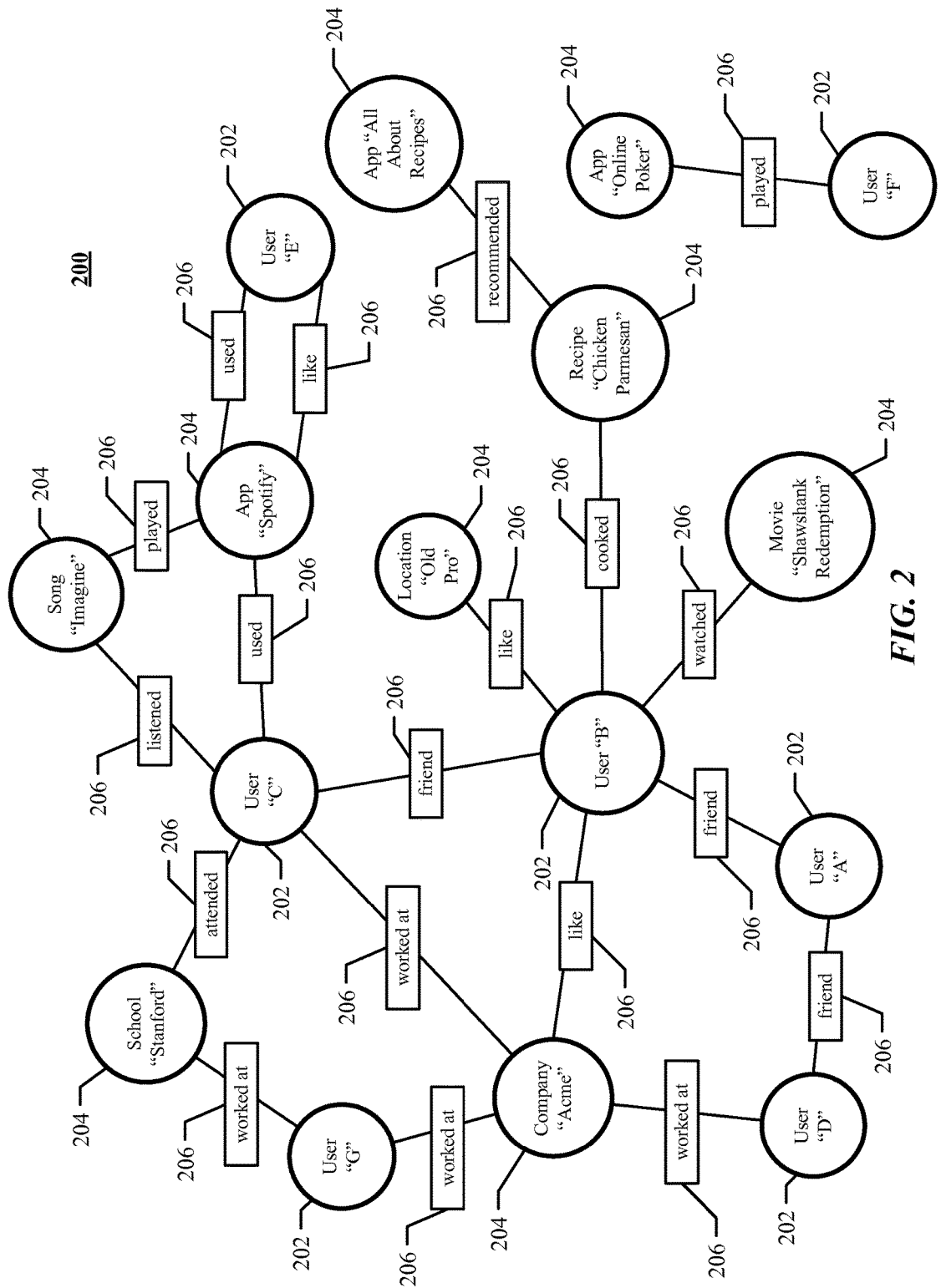
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to send to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, one or more images (e.g., stored on client system 130) may be uploaded by a user to social-networking system 160. As an example, the user may manually upload images stored on client system 130 to social-networking system 160. As another example, client system 130 may automatically upload images stored on client system 130 to social-networking system 160 through image-synching (e.g., depending on privacy settings of the user). In particular embodiments, an application or operating system (OS) of client system 130 may upload images to social-networking 160. Social-networking system 160 may also receive images from a third-party system 170, a shared archive or space, or any other image source. A user may designate as private (or otherwise restrict access to) one or more images, or grant access to one or more images to certain other users of social-networking system 160, based at least in part on privacy settings of the user.

In particular embodiments, images to be uploaded to social-networking system 160 may include associated metadata. The metadata associated with an image may be automatically generated (e.g., by the camera that is the source of the image). Automatically-generated metadata associated with an image may, for example, include information regarding the image and may be stored as EXIF (Exchangeable Image File Format) data. The metadata may include information such as a date and time when the image was taken, the location where the image was taken (e.g., GPS coordinates), compression applied to the image, camera model, and camera settings (e.g., resolution, color information, flash usage, exposure, shutter speed, aperture, focal length, or ISO speed). In particular embodiments, metadata associated with an image may be automatically generated but manually edited before uploading to social-networking system 160 (e.g., edited in a photo application on client system 130). In other embodiments, metadata associated with an image may be manually generated (e.g., by the camera user or by the user of client system 130) before uploading to the social-networking system.

In particular embodiments, images that have been uploaded to social-networking system 160 may be associated with metadata on the social-networking system. The metadata may be manually generated by one or more users of the social-networking system. As an example, if an image is a photo including one or more users of the social-networking system, the photo may be "tagged" or labeled (e.g., by the uploading user or by any user of the social-networking system with the permission to do so) with metadata indicating the names or identifiers of users in the photo. As another example, if the image is a photo taken at a particular location or time, the photo may be tagged with metadata including the location (which may, in particular embodiments, correspond to a concept node in the social graph) or with date or time information, as well. Similarly, if the image is a photo that contains buildings, logos or brands, or any other concepts associated with concept nodes in the social graph, the photo may be tagged with metadata including the identifiers of the corresponding concept nodes. In particular embodiments, the metadata associated with an image may be automatically generated by social-networking system 160. As an example, social-networking system 160 may automatically tag an image with metadata including the identifier of the user who uploaded the image. As another example, the social-networking system may automatically detect one or more faces in an uploaded image. This may, for example, be done using a face-recognition algorithm. Based on the faces detected in the uploaded image, social-networking system 160 may automatically determine that one or more users of the social-networking system are present in the image and may (depending on the users' individual privacy settings) tag the image with metadata including the identifiers of those users present in the image. As another example, the social-networking system may automatically detect locations, buildings, logos or brands, or any other concepts associated with concept nodes in the social graph in an uploaded image (e.g., using computer vision algorithms). The social-networking system may automatically tag the image with metadata including the identifiers of those concept nodes in the social graph that correspond to the automatically detected items.

In particular embodiments, information determined from a social graph of social-networking system 160 may be associated with an image. The information determined from the social graph may, for example, include data associated with users or concepts represented by nodes in the social graph, or data associated with relationships or actions represented by edges in the social graph. As an example, as described above, a photo may include date and GPS metadata (generated, e.g., by the camera which took the photo) that indicate the photo was taken on July 4 at the Golden Gate Bridge. The photo may also include metadata that includes an identifier of User1, a user of the social-networking system who was tagged (e.g., by another user of the social-networking system) as appearing in the photo. The photo may also include metadata that includes an identifier of User2, a user of the social-networking system who was tagged (generated, e.g., automatically by social-networking system 160) as appearing in the photo. Information determined from the social graph may include the fact that User1 and User2 both accepted an event invitation on social-networking system 160 to attend an event titled "Fourth of July at the Golden Gate Bridge." As another example, even if User1 and User2 did not accept an invitation to this event, information determined from the social graph may include the fact that multiple friends of each of User1 and User2 accepted invitations to this event. Based on the combination of metadata and information obtained from the social graph (e.g., either that User1 and User2 accepted an invitation to the event, or, alternatively, that their friends accepted invitations to the event), the photo may have a social context. In this example, the photo may have the social context of being associated with the "Fourth of July at the Golden Gate Bridge" event (e.g., the photo was taken at this event). A social context may include associations with an event, a particular user or set of users, a location, a time, or any other suitable type of association. In particular embodiments, a social context of an image may be determined based on metadata associated with the image. In other embodiments, a social context of an image may be determined based on information determined from the social graph. In yet other embodiments, a social context of an image may be determined by a combination of metadata associated with the image and information determined from the social graph.

The relevance of a social context of an image to a particular user may be determined based on information gathered from the social graph of the social-networking system. As an example and without limitation, images available for display to a user (e.g., when the user is viewing another's profile) may include images having the social context(s) of: being associated with or depicting the user, being associated with or depicting other users connected to the user in the social graph (which may be limited to users connected to the user within a particular degree of separation, users within a particular group or organization, users sharing particular interests or affinities with the user, or users having a similar profile as the user or a target demographic profile), being associated with or depicting particular users or concepts that the user is following, being associated with or depicting an event the user attended, being associated with or depicting an event that those connected to the user in the social graph were invited to or attended, or being associated with or depicting a location or business the user frequents. The social-networking system may determine the relevance of the social context(s) of an image to a user based at least in part on a connection value. As an example and not by way of limitation, a number of users depicted in the image who are connected to the user in the social graph may affect the connection value. Additionally, a degree of separation between the depicted users and the user may affect the connection value. As another example, the type of connection between the user and the users depicted in the image may affect the connection value. As an example and not by way of limitation, "friendship" or "family"-type connections may be associated with a higher connection value than a "work colleague"-type connection. The social-networking system may also determine a relevance of the social context(s) of an image to a user based at least in part on an interest value. The interest value may be based at least in part on whether a social context of the image coincides with a category or categories associated with the user's interests. The interest value may, for example, be based at least in part on whether people, locations, objects, or actions depicted in the image coincide with the category or categories associated with the user's interests. Determination of relevance scores is discussed in further detail in U.S. patent application Ser. No. 12/976,859, filed 22 Dec. 2010 and titled "Timing for Providing Relevant Notifications for a User Based on User Interaction with Notifications," which is incorporated herein by reference.

In particular embodiments, a set of images associated with a first user on social-networking system 160 may be viewable to other users of the social-networking system. For example, if a second user visits a user profile of the first user, a set of images associated with the first user may be available for viewing by the second user (depending, e.g., on permissions or privacy settings of the first user and the relationship between the first user and the second user). The presentation of images to a user of a social-networking system is discussed in further detail in U.S. patent application Ser. No. 13/715,636, filed 14 Dec. 2012 and titled "Rendering Contiguous Image Elements," which is incorporated herein by reference. In particular embodiments, the images associated with the first user may be presented to the second user as a series of albums. As an example, the second user may see a webpage associated with the user profile of the first user containing a series of albums. At the bottom of the webpage, the second user may see an option to browse other albums, for example, additional albums associated with the first user, albums associated with another user of the social-networking system, or albums associated with the second user's own user profile. The albums presented to the second user may include additional information such as, for example, the titles of the albums, brief descriptions of the albums, or any other information associated with the albums or their photos. In particular embodiments, if the second user "hovers" (e.g., with a mouse) over an album, the second user may be able to "like" or comment on the album. Additionally, in particular embodiments, if the second user hovers over an album, the first N (e.g., five) photographs in the album may be automatically cycled through as the representative image of the album presented to the second user while the second user continues to hover over the album. The first user may determine which photos in the album are presented in the automatic cycle when another user hovers over the album.

In particular embodiments, the image or images presented for display to a user may be filtered with one or more display filters. These display filters may be generated (e.g., automatically by social-networking system 160) based on the relevance of the social context(s) of the image or images to the user. As an example, if a second user is viewing the images of a first user on the social-networking system, and several of the first user's images have the social context of being associated with or depicting close friends of the second user at a party the second user also attended, this social context may be determined to be highly relevant to the second user. Based on this determination of relevance, a display filter for images having the social context of being associated with this party may be generated and available to the second user. One or more additional display filters for images having the social context(s) of being associated with one or more of the second user's close friends may also be generated and available to the second user. Thus, the second user may select a display filter (e.g., via a drop-down menu, or other selectable webpage feature) in order to see only those images of the first user that are associated with this party or with a particular close friend of the second user. As another example, if several of the first user's images have the social context of being associated with or depicting fourth-degree connections of the second user on the social graph, the social context of these images may be determined to not be highly relevant to the second user. Based on this determination of relevance (e.g., a lack of relevance), no display filters may be created for this social context. Thus, each image in the social-networking system may have one or more associated social contexts. The relevance of each of these social contexts may be determined with respect to a particular user of the social-networking system. Based on the relevance of each of these social contexts, one or more display filters associated with one or more social contexts may be generated. The user may select a display filter associated with a social context to view only those images having the selected social context.

Figure 3:
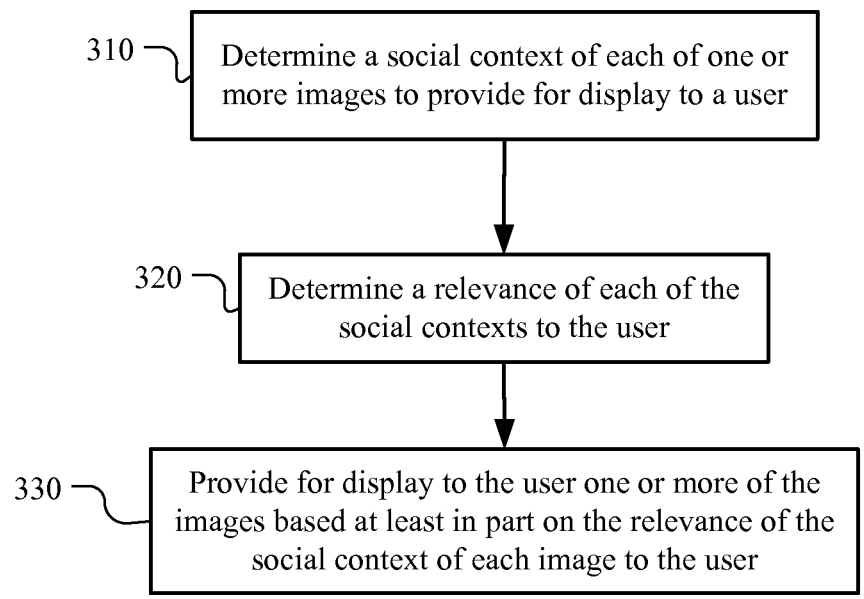
FIG. 3 illustrates an example method for image filtering based on social context.

FIG. 3 illustrates an example method 300 for image filtering based on social context. The method may begin at step 310, where a social context of each of one or more images to be provided for display to a user is determined. At step 320, a relevance of each of the social contexts to the user is determined. At step 330, one or more of the images are provided for display to the user, based at least in part on the relevance of the social context of each image to the user. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
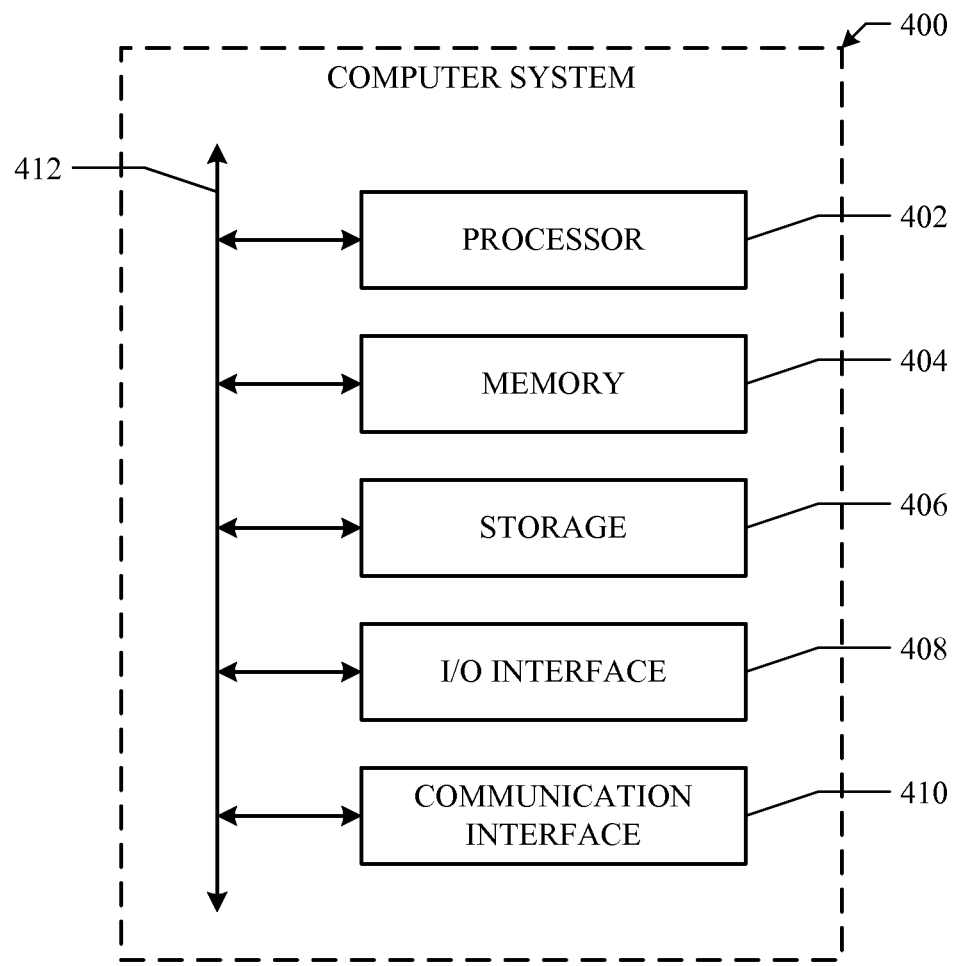
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by one or more computer devices, receiving from a user a request for a media item;
   by one or more computer devices, accessing the stored media item and metadata associated with the media item, wherein the metadata identify one or more persons depicted in the media item, and wherein the one or more persons are each associated with a node of a social graph of a social-networking system;
   by one or more computer devices, obtaining information associated with the one or more persons from the social graph;
   by one or more computing devices, determining a social context associated with the media item using the metadata and information from the social graph;
   by one or more computing devices, determining a relevance of the social context to the user;
   by one or more computing devices, generating a display filter based on the relevance of the social context;
   by one or more computing devices, receiving an instruction from the user to enable the display filter;
   by one or more computing devices, selecting one or more media items associated with the social context in response to the received instruction; and
   by one or more computing devices, providing for display to the user one or more of the selected media items.

2. The method of claim 1, wherein the metadata comprise one or more of the following:
   data automatically generated by the social-networking system;
   data generated by one or more users of the social-networking system; or
   data generated by a source of the media item.

3. The method of claim 1, wherein the relevance of the social context to the user is based at least in part on information associated with the user in the social graph of the social-networking system.

4. The method of claim 1, wherein at least one of the media items is an image.

5. The method of claim 1, wherein at least one of the media items is a Graphics Interchange Format (GIF) animations.

6. One or more computer-readable non-transitory storage media embodying software that is operable when executed to:
   receive from a user a request for a media item;
   access the stored media item and metadata associated with the media item, wherein the metadata identify one or more persons depicted in the media item, and wherein the one or more persons are each associated with a node of a social graph of a social-networking system;
   obtain information associated with the one or more persons from the social graph;
   determine a social context associated with the media item using the metadata and information from the social graph;
   determine a relevance of the social context to the user;
   generate a display filter based on the relevance of the social context;
   receive an instruction from the user to enable the display filter;
   select one or more media items associated with the social context in response to the received instruction; and
   provide for display to the user one or more of the selected media items images based at least in part on the relevance of the social context of each image to the user.

7. The media of claim 6, wherein the metadata comprise one or more of the following:
   data automatically generated by the social-networking system;
   data generated by one or more users of the social-networking system; and
   data generated by a source of the media item.

8. The media of claim 6, wherein the relevance of the social context to the user is based at least in part on information associated with the user in the social graph of the social-networking system.

9. The media of claim 6, wherein at least one of the media items is an image.

10. The media of claim 6, wherein at least one of the media items is a Graphics Interchange Format (GIF) animations.

11. A system comprising:
    one or more processors; and
    a memory coupled to the processors comprising instructions executable by the processors, the processors being operable when executing the instructions to:
    receive from a user a request for a media item;
    access the stored media item and metadata associated with the media item, wherein the metadata identify one or more persons depicted in the media item, and wherein the one or more persons are each associated with a node of a social graph of a social-networking system;
    obtain information associated with the one or more persons from the social graph;
    determine a social context associated with the media item using the metadata and information from the social graph;

determine a relevance of each of the social context to the user;

generate a display filter based on the relevance of the social context;

receive an instruction from the user to enable the display filter;

select one or more media items associated with the social context in response to the received instruction; and provide for display to the user one or more of the selected media items images based at least in part on the relevance of the social context of each image to the user.

12. The system of claim 11, wherein the metadata comprise one or more of the following:

data automatically generated by the social-networking system;

data generated by one or more users of the social-networking system; and data generated by a source of the media item.

13. The system of claim 11, wherein the relevance of the social context to the user is based at least in part on information associated with the user in the social graph of the social-networking system.

14. The system of claim 11, wherein at least one of the media items is an image.

15. The system of claim 11, wherein at least one of the media items is a Graphics Interchange Format (GIF) animations.

* * * * *